United States Patent
Nam et al.

(10) Patent No.: US 10,701,383 B2
(45) Date of Patent: Jun. 30, 2020

(54) METHOD FOR ENCODING/DECODING IMAGE AND DEVICE FOR SAME

(71) Applicant: LG Electronics Inc., Seoul (KR)

(72) Inventors: Junghak Nam, Seoul (KR); Chulkeun Kim, Seoul (KR); Seungwook Park, Seoul (KR); Sehoon Yea, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/737,140

(22) PCT Filed: Jun. 16, 2016

(86) PCT No.: PCT/KR2016/006384
§ 371 (c)(1),
(2) Date: Dec. 15, 2017

(87) PCT Pub. No.: WO2016/204524
PCT Pub. Date: Dec. 22, 2016

(65) Prior Publication Data
US 2018/0192068 A1 Jul. 5, 2018

Related U.S. Application Data

(60) Provisional application No. 62/180,066, filed on Jun. 16, 2015.

(51) Int. Cl.
| H04N 19/44 | (2014.01) |
|---|---|
| H04N 19/117 | (2014.01) |
| H04N 19/80 | (2014.01) |
| H04N 19/124 | (2014.01) |
| H04N 19/159 | (2014.01) |

(52) U.S. Cl.
CPC .......... *H04N 19/44* (2014.11); *H04N 19/117* (2014.11); *H04N 19/124* (2014.11); *H04N 19/159* (2014.11); *H04N 19/80* (2014.11)

(58) Field of Classification Search
CPC .. H04N 19/105; H04N 19/117; H04N 19/119; H04N 19/122; H04N 19/132; H04N 19/169; H04N 19/19; H04N 19/44; H04N 19/513; H04N 19/80
See application file for complete search history.

(56) References Cited

U.S. PATENT DOCUMENTS

| 2011/0228844 A1 | 9/2011 | Watanabe et al. |
| 2012/0051425 A1* | 3/2012 | Chong ................. H04N 19/176 375/240.12 |

(Continued)

FOREIGN PATENT DOCUMENTS

KR 10-2013-0051029 5/2013

*Primary Examiner* — Ross Varndell
(74) *Attorney, Agent, or Firm* — Fish & Richardson P.C.

(57) ABSTRACT

Disclosed in the present invention are a method for encoding/decoding an image and a device for same. Particularly, a method for decoding an image may comprise the steps of: parsing a filter index from a bit stream outputted from an encoder; determining a filter set using the filter index, from among a plurality of filter sets belonging to a predetermined filter bank; deriving a filter coefficient based on a coefficient for filtering, defined by the filter set, which has been determined by the filter index; and applying filtering to a reconstructed image obtained using a prediction signal and a differential signal, by using the derived filter coefficient.

7 Claims, 9 Drawing Sheets

(56) References Cited

U.S. PATENT DOCUMENTS

| | | |
|---|---|---|
| 2012/0155532 A1 | 6/2012 | Puri et al. |
| 2013/0258049 A1 | 10/2013 | Chong et al. |
| 2013/0266059 A1 | 10/2013 | Chong et al. |
| 2014/0037006 A1* | 2/2014 | Rusanovskyy .......... H04N 7/12 375/240.16 |
| 2018/0176601 A1* | 6/2018 | Jeong .................... H04N 19/50 |

* cited by examiner (A)　　　　　　　　　　　(B)

Intra:

2Nx2N　　　　NxN

Inter:

2Nx2N　　　NxN　　　2NxN　　　Nx2N nLx2N　　　nRx2N　　　2NxnU　　　2NxnD

METHOD FOR ENCODING/DECODING IMAGE AND DEVICE FOR SAME

CROSS-REFERENCE TO RELATED APPLICATIONS

This application is a National Stage application under 35 U.S.C. § 371 of International Application No. PCT/KR2016/006384, filed Jun. 16, 2016, which claims the benefit of U.S. Provisional Application No. 62/180,066, filed on Jun. 16, 2015. The disclosures of the prior applications are incorporated by reference in their entirety.

TECHNICAL FIELD

The present invention relates to a method for processing a moving image and more specifically, a method for applying a loop filter to a reconstructed image or a method for encoding/decoding an image using the loop filter; and a device supporting the method.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

SUMMARY OF INVENTION

Technical Problem

An object of the present invention is to provide a method for applying parametric adaptive loop filtering for reconstructed images.

Also, an object of the present invention is to provide a method for generating filter coefficients for applying parametric adaptive loop filtering and a method for applying the filter coefficients.

Also, an object of the present invention is to provide a method for using a parametric adaptive loop filter and an existing adaptive loop filter selectively.

The objects of the present invention are not limited to the technical objects described above, and other technical that are objects not mentioned herein may be understood to those skilled in the art from the description below.

Technical Solution

According to one aspect of the present invention, a method for decoding an image comprises parsing a filter index from a bit stream outputted from an encoder, determining a filter set by using the filter index from among a plurality of filter sets belonging to a predetermined filter bank, deriving filter coefficients on the basis of coefficients for filtering defined in a filter set determined by the filter index, and applying filtering to a reconstructed image obtained from a predicted signal and a difference signal by using the derived filter coefficients.

According to one aspect of the present invention, a device decoding an image may comprise an entropy decoding unit parsing a filter index from a bit stream outputted from an encoder, a filter set determination unit determining a filter set by using the filter index among a plurality of filter sets belonging to a predetermined filter bank, a filter coefficient derivation unit deriving filter coefficients on the basis of coefficients for filtering defined by a filter set determined by the filter index, and a filtering application unit applying filtering to a reconstructed image obtained from a predicted signal and a residual signal by using the derived filter coefficients.

Preferably, the filter index may indicate a filter set that minimizes an error between the original image and the reconstructed image among a plurality of filter sets belonging to the filter bank.

Preferably, the filter bank may be transmitted from the encoder through one of a picture parameter set (PPS), sequence parameter set (SPS), or video parameter set (VPS).

Preferably, the method may further comprise parsing filter residual coefficients from the bit stream, wherein the filter coefficients may be derived by summing coefficients for filtering defined by a filter set determined by the filter index and the filter residual coefficients.

Preferably, the filter index may indicate, from among a plurality of filter sets belonging to the filter bank, a filter set defining coefficients for filtering that has a minimum difference from optimal filter coefficients that minimize an error between the original image and the reconstructed image.

Preferably, the filter residual coefficients may correspond to residuals between the optimal filter coefficients and the coefficients for filtering defined by a filter set determined by the filter index.

Preferably, the method may further comprise parsing model indication information specifying a model for deriving the filter coefficients from the bit stream, wherein the filter coefficients may be derived by summing coefficients for filtering defined by a filter set determined by the filter index and coefficients derived from a model specified by the model indication information.

Preferably, the model indication information may include one or more of a model index indicating which model is used, model parameters for defining characteristics of a model, or coefficients for a model.

Preferably, the method may further comprise parsing a flag indicating type of a filter from the bit stream, wherein whether the filter coefficients are derived from a filter set determined by the filter index among the filter bank is determined according to the value of the flag.

Advantageous Effects

According to an embodiment of the present invention, the amount of bits required for using an adaptive loop filter may be reduced effectively, and thereby compression efficiency may be improved.

Also, according to an embodiment of the present invention, image quality of a reconstructed image may be improved by generating an additional loop filter by using the amount of bits reduced.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

BEST MODE

Figure 1:
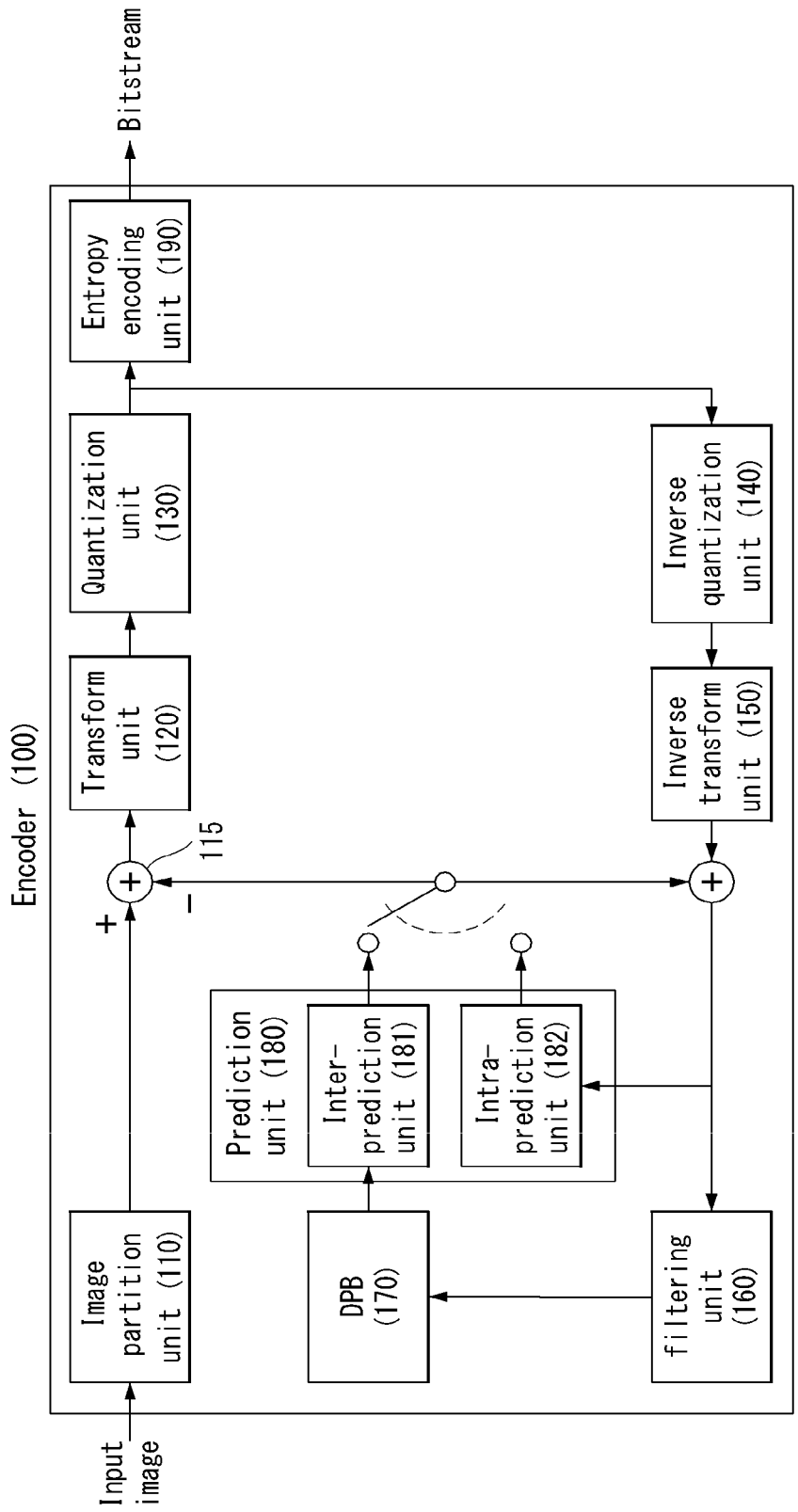
FIG. 1 is an embodiment to which the present invention is applied and illustrates a block diagram of an encoder that encodes a still image or a moving image signal.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. And, the specific terminology may be modified into other forms within the scope of the technical concept of the present invention. For example, a signal, data, a sample, a picture, a frame, a block, etc may be properly replaced and interpreted in each coding process.

In what follows, a 'block' or a 'unit' appearing in this document refers to a unit that performs a process of encoding/decoding such as prediction, transformation and/or quantization and may configured as a multi-dimensional array of samples (or pixels).

A 'block' or a 'unit' may indicate a multi-dimensional array of samples of luma component or may indicate a multi-dimensional array of samples of chroma component. Also, a multi-dimensional array of samples of the luma component and a multi-dimensional array of samples of the chroma component may be called collectively a 'block' or a 'unit'.

For example, a 'block' or a 'unit' may be interpreted to include all of a coding block (CB) indicating an array of target samples of encoding/decoding, a coding tree block (CTB) consisting of a plurality of coding blocks, a prediction block (PB) (or a prediction unit (PU)) indicating an array of samples for which the same prediction is applied, and a transform block (TB) (or a transform unit (TU)) indicating an array of samples for which the same transformation is applied.

Also, unless otherwise mentioned specifically, a 'block' or a 'unit' may be interpreted to include a syntax structure used in a process of encoding/decoding an array of samples with respect to luma and/or chroma component. Here, the syntax structure indicates zero or more syntax elements found in a bit stream according to a specific order, and the syntax element indicates an element of data expressed within a bit stream.

For example, a 'block' or a 'unit' may be interpreted to include all of a coding unit (CU) including a coding block (CB) and a syntax structure used for encoding of the corresponding coding block (CB), a coding tree unit (CTU) comprising a plurality of coding units, a prediction unit (PU) including a prediction block (PB) and a syntax structure used for prediction of the corresponding prediction block (PB), and a transform unit (TU) including a transform block (TB) and a syntax structure used for transformation of the corresponding transform block (TB).

Also, in this document, a 'block' or a 'unit' is not necessarily limited to an array of square or rectangular shaped samples (or pixels) but may indicate an array of samples (or pixels) in the form of polygon having three or more vertices. In this case, the 'block' or the 'unit' may be called a polygon block or a polygon unit.

FIG. 1 is an embodiment to which the present invention is applied and illustrates a block diagram of an encoder that encodes a still image or a moving image signal.

Referring to FIG. 1, an encoder 100 may include a picture partitioning unit 110, a subtract unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. And the prediction unit 180 may include an inter-prediction unit 181 and an intra-prediction unit 182.

The picture partitioning unit 110 partitions an input video signal (or picture or frame) input to the encoder 100 into one or more blocks.

The subtract unit 115 subtracts a predicted signal (or predicted block) outputted from the prediction unit 180 (namely inter-prediction unit 181 or intra-prediction unit 182) from the input video signal and generates a residual signal (or a residual block). The generated residual signal (or residual block) is transmitted to the transform unit.

The transform unit 120 generates transform coefficients by applying a transform technique (for example, DCT (Discrete Cosine Transform), DST (Discrete Sine Transform), GBT (Graph-Based Transform), and KLT (Karhunen-Loeve Transform)) to a residual signal (or a residual block). At this time, the transform unit 120 may generate transform coefficients by performing transformation by using the transform technique determined according to the prediction mode applied to the residual block and the residual block size.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, a quantized signal outputted from the quantization unit 130 may be used for generating a prediction signal. For example, a quantized signal may reconstruct a residual signal by applying dequantization and inverse transform through the dequantization unit 140 and the inverse transform unit 150 within a loop. By adding the reconstructed residual signal to the prediction signal outputted from the inter-prediction unit 181 or the intra-prediction unit 182, a reconstructed signal (or reconstructed block) may be generated.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy.

Here, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels.

The intra-prediction unit 182 predicts a current block by referring to the samples in the vicinity of a block to be encoded. The intra-prediction unit 182 may perform the following process to perform intra-prediction. First, the intra-prediction unit 182 may prepare for reference samples required to generate a prediction signal. And the intra-prediction unit 182 may generate a predicted signal (predicted block) by using the prepared reference samples. Afterwards, the predicted mode is encoded. At this time, reference samples may be prepared through reference sample padding and/or reference sample filtering. A quantization error may be developed since reference samples go through the prediction and reconstruction process. Therefore, to reduce the error, a reference sample filtering process may be performed for each prediction mode used for intra-prediction.

The predicted signal (or predicted block) generated through the inter-prediction unit 181 or the intra-prediction unit 182 may be used for generating a reconstruction signal (or reconstruction block) or for generating a residual signal (or residual block).

Figure 2:
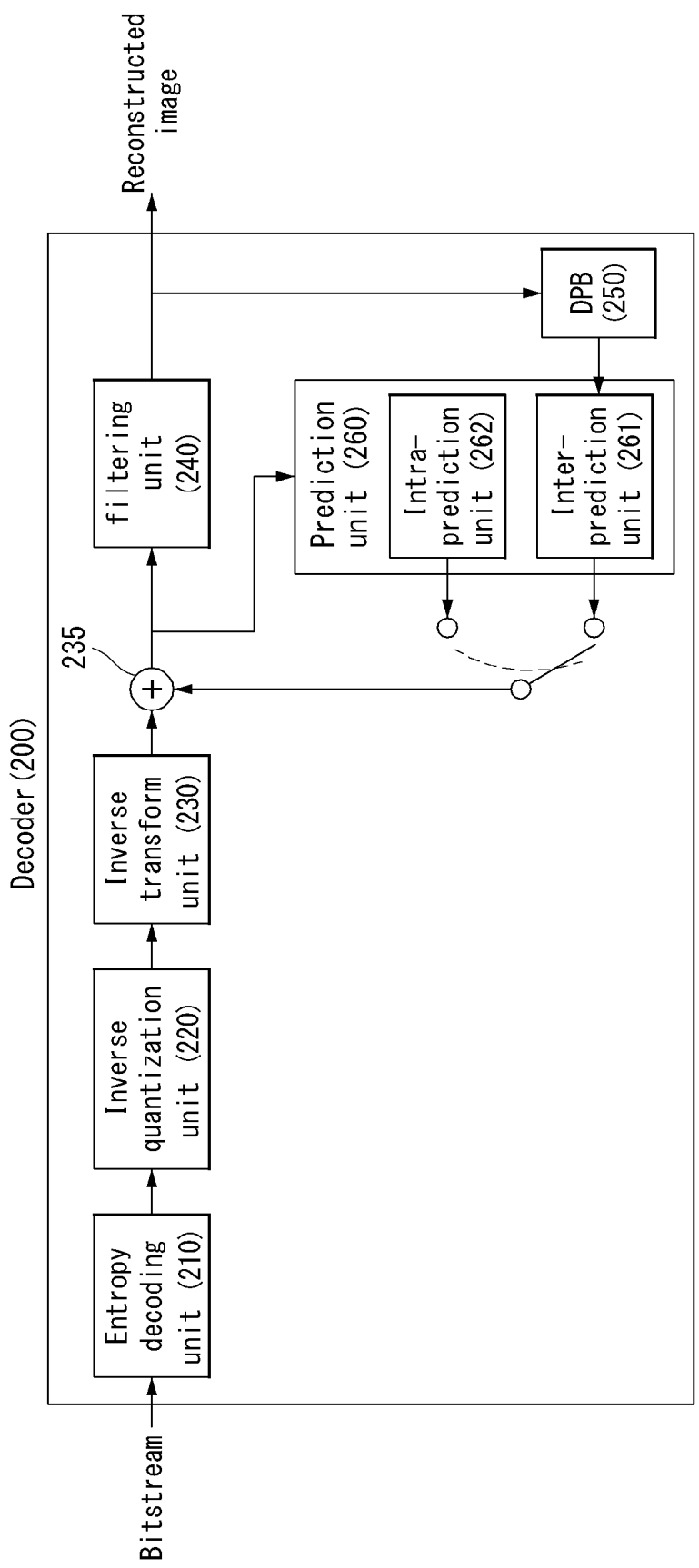
FIG. 2 is an embodiment to which the present invention is applied and illustrates a block diagram of a decoder that decodes an encoded still image or moving image signal.

FIG. 2 is an embodiment to which the present invention is applied and illustrates a block diagram of a decoder that decodes an encoded still image or moving image signal.

Referring to FIG. 2, a decoder 200 may include an entropy decoding unit 210, a dequantization unit 220, an inverse transform unit 230, an add unit 235, a filtering unit 240, a decoded picture buffer (DPB) 250 and a prediction unit 260. And the prediction unit 260 may include an inter-prediction unit 261 and an intra-prediction unit 262.

And, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 obtains a residual signal (or residual block) by inversely transforming transform coefficients by applying an inverse transform technique.

The add unit 235 generates a reconstructed signal (or reconstructed block) by adding the obtained residual signal (or residual block) to the predicted signal (or predicted block) outputted from the prediction unit 260 (or inter-prediction unit 261 or intra-prediction unit 262).

The filtering unit 240 applies filtering to the reconstructed signal (or reconstructed block) and outputs the filtered signal to a playback device or transmit the filtered signal to the decoded picture buffer 250. The filtered signal transmitted to the decoded picture buffer 250 may be used as a reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

Block Partition Structure

Generally, the block-based image compression method is used in the compression technique (e.g., HEVC) of a still image or a video. The block-based image compression method is a method of processing an image by partitioning it into a specific block unit, and may decrease the use of memory and the amount of operation.

Figure 3:
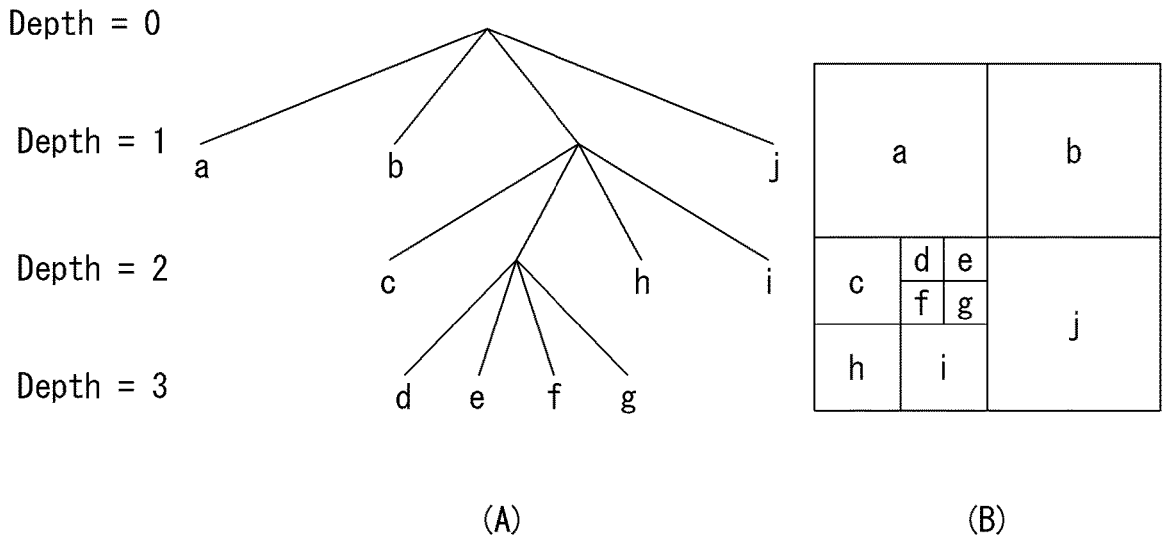
FIG. 3 illustrates a partition structure of a coding unit to which the present invention may be applied.

FIG. 3 is a diagram for describing a partition structure of a coding unit that may be applied to the present invention.

An encoder partitions a single image (or picture) in a coding tree unit (CTU) of a rectangle shape, and encodes the CTU sequentially one by one according to a raster scan order.

In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

One CTU may be divided into a quadtree structure. In other words, while maintaining the square shape, one CTU is divided into four units, each of which having half horizontal size and half vertical size, forming a coding unit (CU). The aforementioned division into the quadtree structure may be performed recursively. In other words, a CU is divided hierarchically from one CTU into the quadtree structure.

A CU refers to a processing step of an input image, for example, a basic unit of coding in which intra/inter-prediction is performed. A CU comprises a coding block (CB) for the luma component and a CB for two chroma components corresponding to the CB for the luma component. In the HEVC, the size of the CU may be determined by one of 64×64, 32×32, 16×16, and 8×8.

Referring to FIG. 3, the root node of the quadtree is associated with the CTU. The quadtree is subdivided until it reaches a leaf node, where a leaf node corresponds to the CU.

More specifically, the CTU corresponds to the root node and has the smallest depth (namely depth=0). Depending on the characteristics of an input image, the CTU may not be subdivided, where, in this case, the CTU corresponds to the CU.

The CTU may be subdivided in the form of quadtree, and as a result, lower nodes having the depth of 1 (depth=1) are generated. And of the lower nodes having the depth of 1, a node that is not subdivided further (namely a leaf node) corresponds to the CU. For example, in FIG. 3(b), CU(a), CU(b), and CU(j) corresponding to the node a, b, and j have been subdivided once from the CTU and have the depth of 1.

Of the nodes having the depth of 1, at least one may be subdivided again in the form of quadtree and as a result, lower nodes having the depth of 1 (namely depth=2) are generated. And from among the lower nodes having the depth of 2, the node that is not subdivided further (namely leaf node) corresponds to the CU. For example, in FIG. 3(b), CU(c), CU(h), and CU(i) corresponding to the node c, h, and i have been subdivided twice from the CTU and have the depth of 2.

Also, from among the nodes having the depth of 2, at least one may be subdivided again in the form of quadtree and as a result, lower nodes having the depth of 3 (namely depth=3) are generated. And among the lower nodes having the depth of 3, a node that is not subdivided further (namely leaf node) corresponds to the CU. For example, in FIG. 3(b), CU(d), CU(e), CU(f), and CU(g) corresponding to the node d, e, f, and g have been subdivided three times from the CTU and have the depth of 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quadtree shape, the size of SCU may be obtained by using a size of LCU and the maximum depth information. Or, inversely, the size of LCU may be obtained by using a size of SCU and the maximum depth information of the tree.

For each CU, information indicating whether the corresponding CU is split (for example, split_cu_flag) may be delivered to the decoder. This split mode is included in all of CUs except for the SCU. For example, if the flag indicating whether to split is '1', the corresponding CU is split again into four CUs. If the flag indicating whether to split is '0', the corresponding CU is not split further, and processing of the corresponding CU may be performed.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quadtree structure, but is partitioned once in a single CU in a predetermined shape. This will be described by reference to the drawing below.

Figure 4:
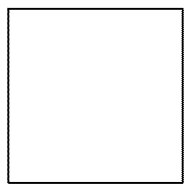
FIG. 4 illustrates a prediction unit to which the present invention may be applied.
Figure 4:
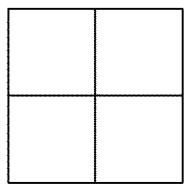
Figure 4:
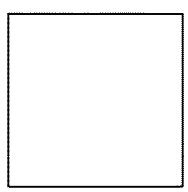
Figure 4:
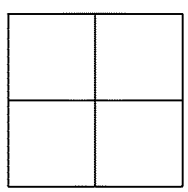
Figure 4:
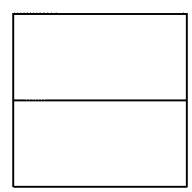
Figure 4:
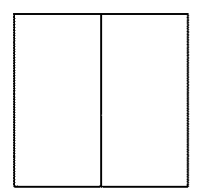
Figure 4:
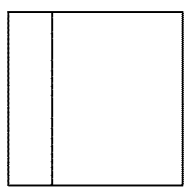
Figure 4:
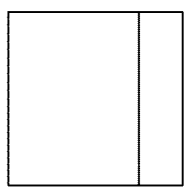
Figure 4:
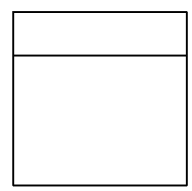
Figure 4:
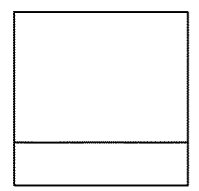

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4(a) illustrates a PU of the case that the intra-prediction mode is used, and FIG. 4(b) illustrates a PU of the case that the inter-prediction mode is used.

Referring to FIG. 4(a), assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to FIG. 4(b), assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD)

Similar to the intra-prediction, the PU partition of N×N shape may be performed only in the case that the size of CB for the luma component of CU is the minimum size (i.e., the case that a CU is an SCU).

The inter-prediction supports the PU partition in the shape of 2N×N that is partitioned in a horizontal direction and in the shape of N×2N that is partitioned in a vertical direction.

In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the dequantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

In the intra-prediction mode, the prediction mode is selected for each PU unit, and for the selected prediction mode, prediction and reconfiguration are performed on the basis of an actual TU unit.

A TU refers to a basic unit in which actual prediction and reconfiguration are performed. The TU includes a transform block (TB) for the luma component and a TB for two chroma components corresponding to the TB for the luma component.

Like the example of FIG. 3 in which one CTU is subdivided into the quadtree structure to form a CU, the TU is subdivided into the quadtree structure hierarchically from one CU to be coded.

Since the TU is split into the quadtree structure, the TU split from a CU may be split further down to a smaller sub-TU. In the HEVC, the size of the TU may be determined by one of 32×32, 16×16, 8×8, and 4×4.

Referring again to FIG. 3, it is assumed that the root node of the quadtree is associated with the CU. The quadtree is subdivided until it reaches a leaf node, where the leaf node corresponds to the TU.

More specifically, the CU corresponds to the root node and has the smallest depth (namely depth=0). The CU may not be subdivided depending on the characteristics of an input image, where, in this case, the CU corresponds to the TU.

The CU may be subdivided in the form of quadtree and as a result, lower nodes having the depth of 1 (depth=1) are generated. And among the lower nodes having the depth of 1, the node that are not subdivided further (namely leaf node) corresponds to the TU. For example, in FIG. 3(b), TU(a), TU(b), and TU(j) corresponding to the node a, b, and j have been subdivided once from the CU and have the depth of 1.

Of the nodes having the depth of 1, at least one may be subdivided again in the form of quadtree and as a result, lower nodes having the depth of 1 (namely depth=2) are generated. And from among the lower nodes having the depth of 2, the node that is not subdivided further (namely leaf node) corresponds to the TU. For example, in FIG. 3(b), TU(c), TU(h), and TU(i) corresponding to the node c, h, and i have been subdivided twice from the CU and have the depth of 2.

Also, from among the nodes having the depth of 2, at least one may be subdivided again in the form of quadtree and as a result, lower nodes having the depth of 3 (namely depth=3) are generated. And among the lower nodes having the depth of 3, a node that is not subdivided further (namely leaf node) corresponds to the TU. For example, in FIG. 3(b), TU(d), TU(e), TU(f), and TU(g) corresponding to the node d, e, f, and g have been subdivided three times from the CU and have the depth of 3.

A TU having the tree structure may be subdivided hierarchically with predetermined maximum depth information (or maximum level information). And each subdivided TU may have depth information. Since the depth information represents the number of subdivisions of the TU and/or the degree of subdivisions, the depth information may include information about the size of the TU.

For each TU, information indicating whether the corresponding TU is split (for example, split_transform_flag) may be delivered to the decoder. This subdivision information is included in all of TUs except for the TU having the smallest size. For example, if the flag indicating whether to split is '1', the corresponding TU is split again into four TUs. If the flag indicating whether to split is '0', the corresponding TU is not split further.

Method for Image Encoding/Decoding by Using Parametric Adaptive Loop Filter (ALF)

In general, adaptive loop filter (ALF) refers to the technique for filtering a completely decoded reconstructed image (for example a reconstructed image generated by summing a prediction signal and a residual signal) by using filter coefficients received from the encoder.

The encoder calculates filter coefficients that minimize an error between the reconstructed image and the original image in pixel units and transmits the calculated filter coefficients to the decoder.

The filter coefficients may be integers or real numbers, and the encoder may send N filters in the shape of M×1 or M×M. In general, the higher the M and N, the higher the coding performance may be gained. However, sending a large number of filter coefficients requires an additional amount of bits.

In this regard, the present invention proposes an encoding/decoding method that uses a parametric adaptive loop filter for effective transmission of filter coefficients.

According to the present invention, differently from the conventional method transmitting filter coefficients from the encoder to the decoder, parameters related to the filter are transmitted from the encoder to the decoder. In other words, the parametric loop filter (e.g., parametric ALF) according to the present invention refers to the loop filter of which the coefficients and/or shape and/or size is determined according to the parameters related to the loop filter transmitted from (provided by) the encoder.

In what follows, in the description of the present invention, the loop filter may be called an in-loop filter and indicates a filter applied within the encoding/decoding process.

Also, for the convenience of descriptions, as one example of a loop filter, the present invention is described with respect to the adaptive loop filter (ALF). However, the present invention is not limited to the descriptions given, which may be applied in the same way for the embodiments employing a loop filter available in addition to the ALF.

Embodiment 1

Figure 5:
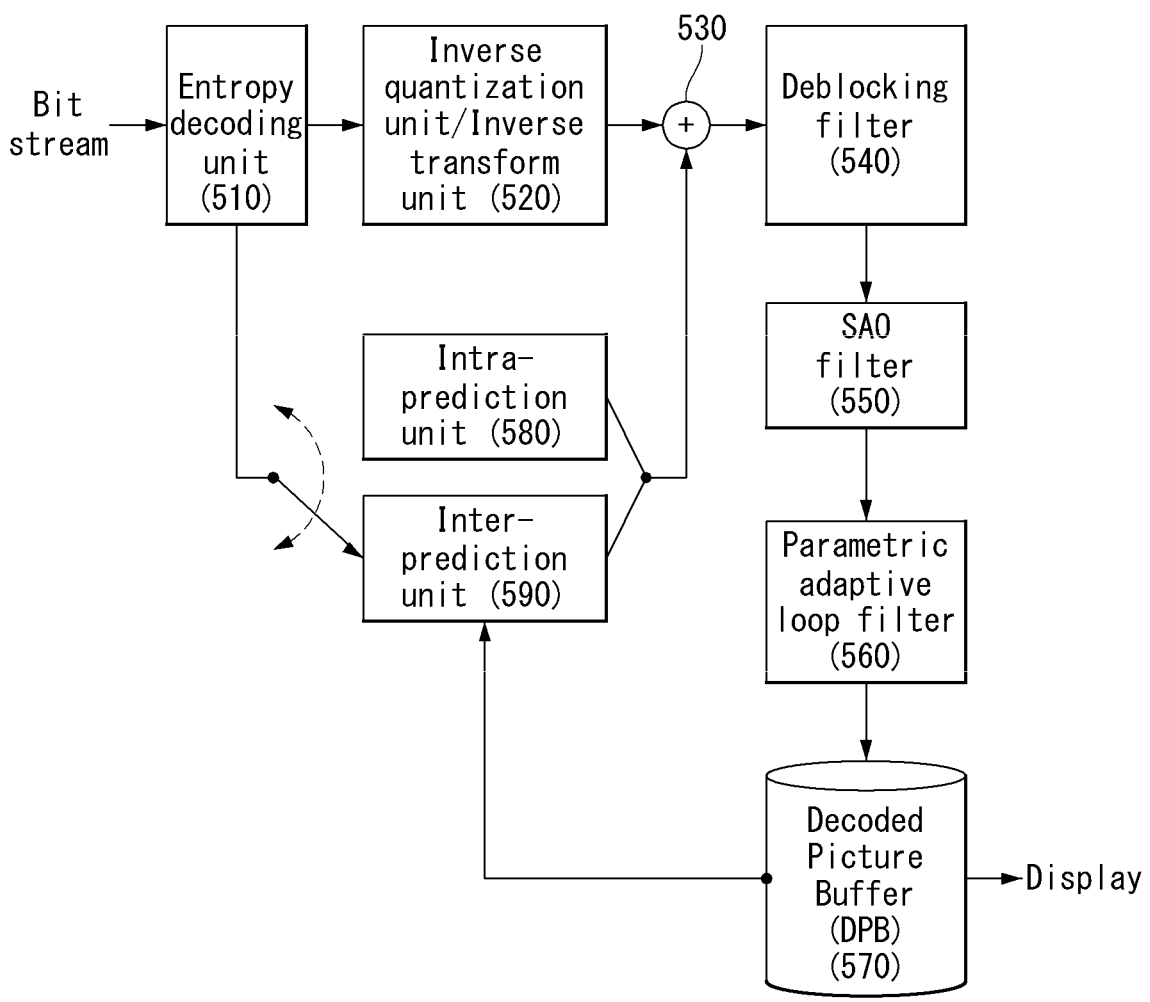
FIG. 5 illustrates a decoder including a parametric adaptive loop filter according to one embodiment of the present invention.

FIG. 5 illustrates a decoder including a parametric adaptive loop filter according to one embodiment of the present invention.

Referring to FIG. 5, a decoder may configured as an entropy decoding unit 510, dequantization/inverse transform unit 520, adder 530, deblocking filter 540, sample adaptive offset (SAO) filter 550, parametric adaptive loop filter (ALF) 560, decoded picture buffer (DPB) 570, intra-prediction unit 580, and inter-prediction unit 590.

The entropy decoding unit 510 performs entropy decoding of a signal outputted from the encoder (namely a bit stream). In particular, the entropy decoding unit 510 may parse (or derive) parametric ALF-related parameters from the bit stream.

The dequantization/inverse transform unit 520 obtains transform coefficients from the entropy-decoded signal by using quantization step size information and obtains a residual signal (or residual block) by inversely transforming transform coefficients by applying an inverse transform technique.

Although FIG. 5 illustrates a case in which a dequantization unit and an inverse transform unit are implemented in the same block, they may be implemented separately from each other as shown in FIG. 2.

The adder 530 generates a reconstructed signal (or reconstructed block) by adding the obtained residual signal (or residual block) to the predicted signal (or predicted block) outputted from the prediction unit (namely inter-prediction unit 590 or intra-prediction unit 580).

The embodiments described with respect to the inter-prediction unit 181 and the intra-prediction unit 182 of the encoder 100 of FIG. 1 may be applied to the inter-prediction unit 590 and the intra-prediction unit 580 of the decoder, respectively.

The deblocking filter 540 applies a deblocking filtering to the reconstructed signal (or reconstructed image).

The SAO filter 550 applies SAO filtering by adding SAO for each pixel to the reconstructed signal (or reconstructed image) for which deblocking filtering is applied.

The parametric ALF 560 is a filter applied to the image for which up to the SAO filter is applied and is used to minimize an error from the original image. In particular, the parametric ALF 560 may determine filter coefficients and/or filter size and/or filter form by using the parametric ALF-related parameters received from the entropy decoding unit 510. And filtering may be performed by using the determined filter.

Also, different from the example of FIG. 5, the parametric ALF may be applied to the reconstructed signal (or reconstructed block) outputted from the adder 530 (in this case, the deblocking filter 540 and SAO filter 550 may be omitted) or may be applied to the deblocking filtered image outputted from the deblocking filter 540 (in this case, the SAO filter 550 may be omitted).

Although FIG. 5 illustrates a case in which the deblocking filter 540, SAO filter 550, and ALF 560 are implemented separately, the deblocking filter 540, SAO filter 550, and ALF 560 may be implemented in one filtering unit as shown in FIG. 2.

The DPB 570 may store a filtered picture to display the filtered picture or to use the filtered picture as a reference picture in the inter-prediction unit 590.

The parametric ALF 560 is a filter that minimizes an error between the original image O_t, which is currently a decoding target (at time t) and the reconstructed image R_t, which is expressed by Eq. 1 below. At this time, the reconstructed image R_t represents a reconstructed image (for example, an image generated by summing a predicted signal and a residual signal) with respect to the original image O_t, which is a currently decoding target.

$$E = \sum_{x,y} \left( O_t(x, y) - \sum_{i,j=-M/2-1}^{M/2} (f(i, j) \times R_t(x+i, y+j)) \right)^2 \quad \text{[Eq. 1]}$$

In Eq. 1, (x, y) represents the horizontal and the vertical coordinate of a pixel, and M represents the filter size.

Therefore, in the case of the existing ALF, the encoder calculates the filter coefficient f that minimizes the error function of Eq. 1 and delivers the filter coefficient f to the decoder.

On the other hand, the parametric ALF according to the present invention, parameters related to the loop filter are delivered from the encoder to the decoder, and the decoder may determine a filter by using the parameters related to the loop filter received from the encoder. In other words, the decoder may determine the filter size M and/or filter coefficient f and/or filter form on the basis of the parameters related to the loop filter.

In what follows, more detailed descriptions will be given.

Embodiment 2

According to one embodiment of the present invention, to minimize the overhead due to transmitting coefficients of an adaptive loop filter at the picture level, the encoder/decoder (in particular, filtering unit or parametric ALF) may configure a filter bank exhibiting characteristics of the adaptive loop filter.

The encoder may transmit to the decoder a filter index for a filter set that minimizes an error between the original image and a reconstructed image within the filter bank.

The decoder may derive filter coefficients and/or filter size and/or filter form from a filter set specified by the filter index received form the encoder within the filter bank.

Figure 6:
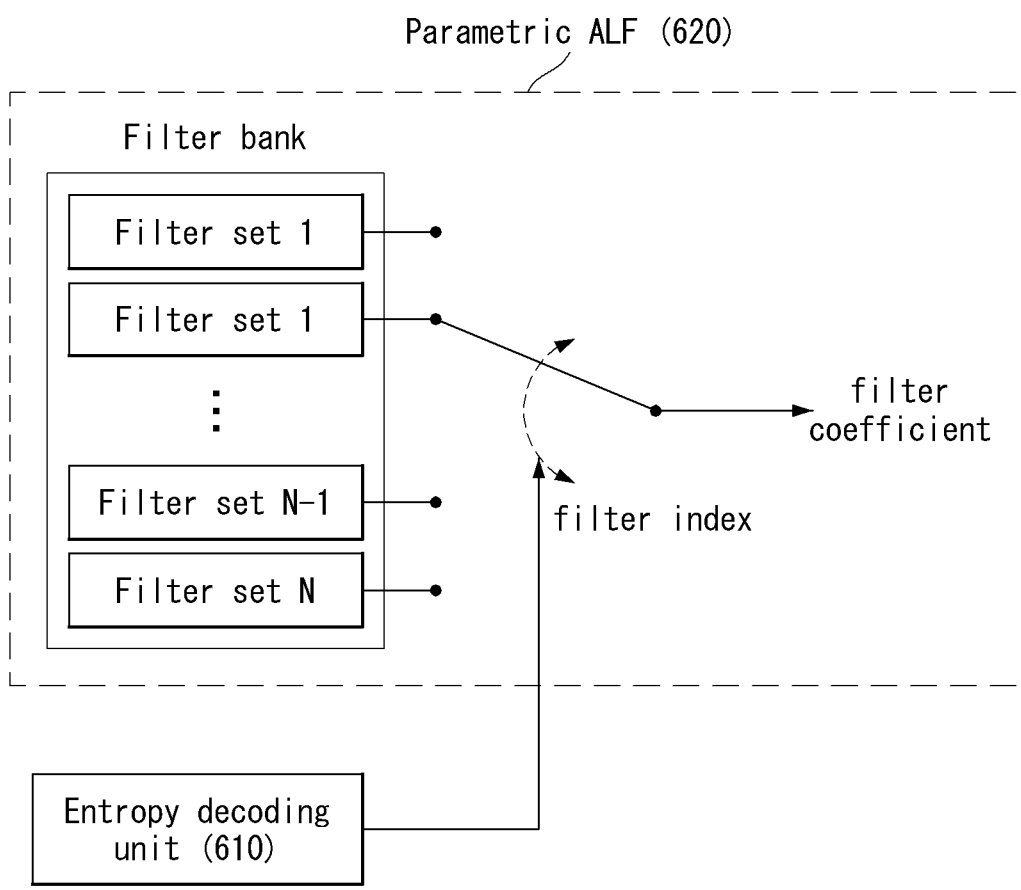
FIG. 6 illustrates a parametric adaptive loop filter operation according to one embodiment of the present invention.

FIG. 6 illustrates a parametric adaptive loop filter operation according to one embodiment of the present invention.

Referring to FIG. 6, the entropy decoding unit 610 of the decoder may parse (or derive) the filter index from a bit stream outputted from the encoder. And the entropy decoding unit 610 delivers the parsed (or derived) filter index to the parametric ALF 620.

The parametric ALF 620 may derive the filter coefficients from a specific filter set indicated by the filter index received from the entropy decoding unit 610 within a pre-configured filter bank.

Here, a filter bank may configured as a plurality of (N) filter sets.

For each filter set, coefficients for loop filtering and/or size of the loop filter and/or form of the loop filter may be defined.

The aforementioned configuration of the filter bank may be defined in the same manner for both of the encoder and the decoder. In this case, the encoder doesn't have to deliver the filter bank to the decoder.

Or, the encoder may transmit the filter bank to the decoder in units of such as slice header, picture parameter set (PPS), sequence parameter set (SPS), or video parameter set (VPS). This implies that a filter bank may be determined in units of a slice, picture, sequence, or video.

The slice header refers to a slice segment header of an independent slice segment, where an independent slice segment refers to a current slice segment or the most recent, independent slice segment preceding a current dependent slice segment according to a decoding order.

The picture parameter set (PPS) refers to the syntax structure including syntax elements applied to zero or more coded pictures determined by the syntax elements obtained within each slice segment header.

The sequence parameter set (SPS) refers to the syntax structure including syntax elements applied to zero or more coded video sequences (CVSs) determined by the content of syntax elements obtained within the PPS referenced by the syntax element obtained within each slice segment header.

The video parameter set (VPS) refers to the syntax structure including syntax elements applied to zero or more CVSs determined by the content of syntax elements obtained within the SPS referenced by the syntax element obtained within the PPS referenced by the syntax element obtained within each slice segment header.

A filter bank may configured as a combination of filters such as low-pass filters, high-pass filters, all-pass filters, and band-pass filters. Also, the filter bank may include the characteristics of a filter designed according to an image direction or complexity of texture.

A filter index refers to the information indicating a specified filter set from among N filter sets belonging to the filter bank.

A method for calculating a filter index is given by Eq. 2 below.

$$\text{Filter\_index} = \arg\min_n \left( \sum_{x,y} \left( O(x, y) - \sum_{i,j=-M/2-1}^{M/2} (f_n(i, j) \times R(x+i, y+j)) \right)^2 \right) \quad [\text{Eq. 2}]$$

In Eq. 2, O(x, y) and R(x, y) represent the original image and the reconstructed image; and (x, y) represents the horizontal and vertical coordinates of a pixel. f_n represents the filter coefficients of a filter set n.

Also, in Eq. 2, the number of filters of a filter bank (namely the number of filter sets) is N, and the filter size is M×M.

Referring to Eq. 2, the encoder may select a filter set that minimizes the residual between the original image O and the reconstructed image R to which filter coefficients of the corresponding filter have been applied for each filter set belonging to the filter bank. And the filter index may indicate the selected filter set.

In other words, a filter set that minimizes an error between the original image and the reconstructed image may be specified by the filter index from within the filter bank.

Meanwhile, although FIG. 6 and Eq. 2 illustrate only the case in which a filter set is selected by a filter index, and filter coefficients are determined by the selected filter set, the present invention is not limited to the case above.

In other words, the present invention may be applied in the same manner to the case a filter form and/or a filter size and/or filter coefficients are defined differently for each filter set belonging to the filter bank.

For example, filter set 1 may be defined to have the form of M×1 with the size M and coefficients may be defined as $\{a\_0, \ldots, a\_M-1\}$; filter set 2 may be defined to have the form of M×M with the size M and coefficients may be defined as $\{b\_0,0, \ldots, b\_M,M\}$; and filter set 3 may be defined to have the (asymmetric) form of M×K and coefficients may be defined as $\{c\_0,0, \ldots, c\_M,M\}$.

In this case, the encoder calculates the error between the original image and the reconstructed image for each filter set belonging to the filter bank by using Eq. 2, thereby determining the optimal filter set (namely filter size, shape, and coefficients) that minimizes the error between the original image and the reconstructed image. And the encoder may transmit the filter index indicating the corresponding filter set to the decoder.

The decoder, similar to the example of FIG. 6, may derive the filter size and/or filter form and/or filter coefficients from a filter set specified by the filter index received from the encoder within a preconfigured filter bank.

Embodiment 3

According to one embodiment of the present invention, to minimize the overhead due to transmitting coefficients of an adaptive loop filter at the picture level, the encoder/decoder (in particular, filtering unit or parametric ALF) may configure a filter bank exhibiting characteristics of the adaptive loop filter.

The encoder may derive optimal filter coefficients that minimize the error between the original image and the reconstructed image and transmit the filter index and filter residuals (or filter residual coefficients) of the filter set configured as optimal filter coefficients within the filter bank and the filter coefficients that yield the smallest residuals (or filter residual coefficients) to the decoder.

The decoder may derive filter coefficients by summing the filter coefficients of a filter set selected by the filter index received from the encoder within the filter bank and the filter residuals received from the encoder. Also, the decoder may derive the filter form and/or filter size from the filter set selected by the filter index received from the encoder.

Figure 7:
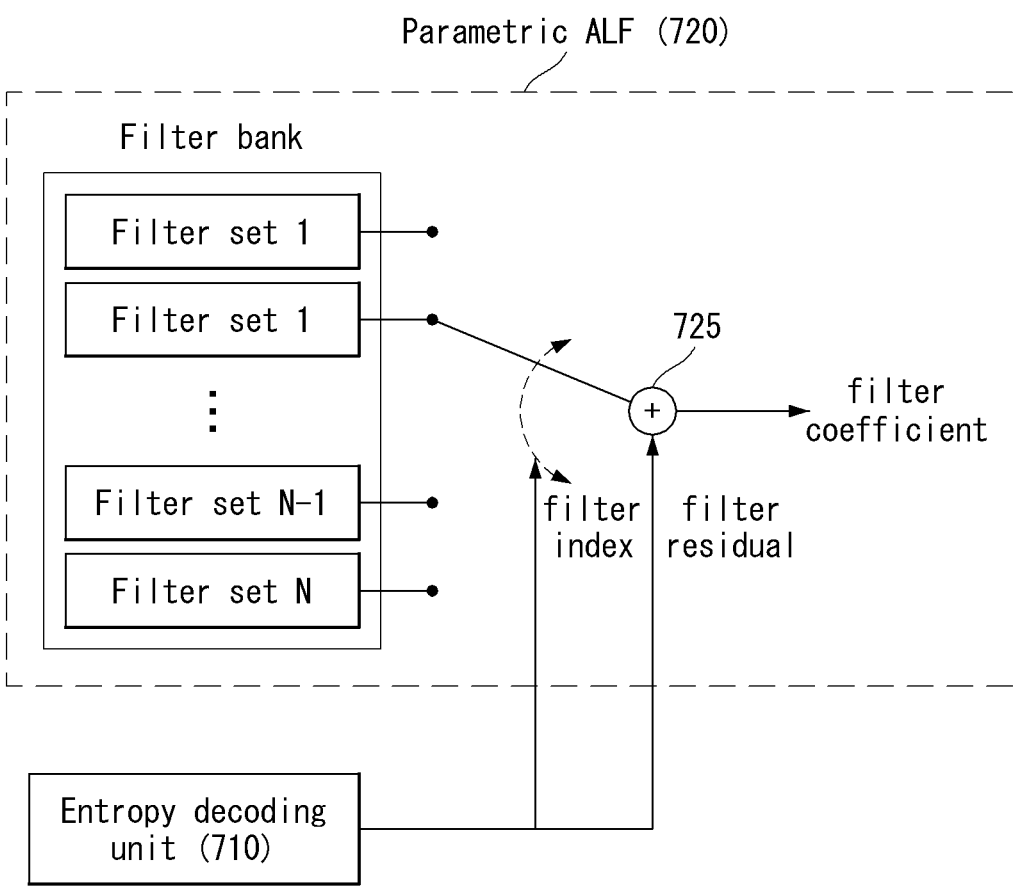
FIG. 7 illustrates a parametric adaptive loop filter operation according to one embodiment of the present invention.

FIG. 7 illustrates a parametric adaptive loop filter operation according to one embodiment of the present invention.

Referring to FIG. 7, the entropy decoding unit 710 of the decoder may parse (or derive) the filter index and filter residuals from a bit stream outputted from the encoder. And the entropy decoding unit 710 delivers the parsed (or derived) filter index and filter residuals to the parametric ALF 720.

The parametric ALF 720 may obtain the filter coefficients of a specific filter set indicated by the filter index received from the entropy decoding unit 710 within a pre-configured filter bank. And the adder 725 within the parametric ALF 720 may derive filter coefficients by adding the filter coefficients of a filter set and the filter residuals received from the entropy decoding unit 710.

As described above, a filter bank may configured as a plurality of (N) filter sets. At this time, a filter bank may configured as a combination of filters such as low-pass filters, high-pass filters, all-pass filters, and band-pass filters. Also, the filter bank may include the characteristics of a filter designed according to an image direction or complexity of texture.

For each filter set, coefficients for loop filtering and/or size of the loop filter and/or form of the loop filter may be defined. And the filter index implies information indicating a filter set specified among N filter sets belonging to a filter bank.

Also configuration of a filter bank may be used in the same manner for the encoder and the decoder, which may be transmitted from the encoder to the decoder in units of slice header, PPS, SPS, or VPS.

To obtain the filter residuals (or filter residual coefficients), the encoder may calculate optimal filter coefficients at the picture level as in the conventional adaptive loop filter method. As one example, the optimal filter coefficients may be obtained by applying a numerical analysis method that reduces the error between the original image and the reconstructed image, such as the Weiner filter.

Also, the encoder may select a filter set configured as filter coefficients yielding the smallest residuals in comparison to the optimal filter coefficients from among the filter sets belonging to the filter bank.

Equation 3 illustrates a method for calculating a filter index and filter residuals (or filter residual coefficients).

$$\text{Filter\_index} = \arg\min_n \left( \sum_{i,j=-M/2-1}^{M/2} (f_o(i, j) - f_n(i, j))^2 \right) \quad [\text{Eq. 3}]$$

In Eq. 2, O(x, y) and R(x, y) represent the original image and the reconstructed image; and (x, y) represents the horizontal and vertical coordinates of a pixel.

f_o represents optimal filter coefficients obtained by the encoder, and f_n represents the filter coefficients of a filter set n.

Also, in Eq. 3, the number of filters of a filter bank (namely the number of filter sets) is N, and the filter size is M×M.

Referring to Eq. 3, the encoder may select a filter set that minimizes the residual between the filter coefficients f_o that yield the smallest residual between the original image O and the reconstructed image R for each filter set belonging to the filter bank and the filter coefficients of the corresponding filter set. And the filter index may indicate the selected filter set.

In other words, a filter set configured as filter coefficients that yield the smallest residual from the filter coefficients that minimize the error between the original image and the reconstructed image may be selected from the filter bank by the filter index.

At this time, the filter residuals (namely filter residual coefficients) may be calculated by Eq. 4 below.

$$\text{Filter\_residuals}(i,j) = f_o(i,j) - f_k(i,j) \quad [\text{Eq. 4}]$$

(i, j=−M/2−1, . . . , M/2)

In Eq. 4, k represents the filter index for a filter set configured as filter coefficients minimizing the error between the original image and the reconstructed image; and the filter coefficients yielding the smallest residual.

Referring to FIG. 4, filter residuals (namely filter residual coefficients) may be calculated by subtracting the filter coefficients of a selected filter set from the filter coefficients that minimize the error between the original image and the reconstructed image.

Meanwhile, although FIG. 7 and Eqs. 3 and 4 illustrate only the case in which a filter set is selected by a filter index and filter coefficients are determined from the filter coefficients of the selected filter set and filter residuals, the present invention is not limited to the illustrating case. In other words, for the convenience of descriptions, it is assumed that each filter set belonging to a filter bank has the same filter form and the filter size, but the present invention is not limited to the assumption.

In other words, the present invention may be applied in the same manner to the case a filter form and/or a filter size and/or filter coefficients are defined differently for each filter set belonging to the filter bank.

For example, filter set 1 may be defined to have the form of M×1 with the size M and coefficients may be defined as {a_0, . . . , a_M−1}; filter 2 may be defined to have the form of M×M with the size M and coefficients may be defined as {b_0,0, . . . , b_M,M}; and filter set 3 may be defined to have the (asymmetric) form of M×K and coefficients may be defined as {c_0,0, . . . , c_M,M}.

In this case, the encoder may obtain an optimal filter (namely filter size, form, and coefficients) that yields the smallest error between the original image and the reconstructed image. And among each filter set belonging to the filter bank, a filter of which the size and the form are the same as those of the filter calculated by the encoder is selected, and a filter set that yields the smallest residuals of the filter coefficients may be determined from among the selected filter set. And the filter index indicating the corresponding filter set and the filter residuals may be transmitted to the decoder.

The decoder, similar to the example of FIG. 7, may derive the filter coefficients by summing the filter coefficients of a filter set specified by the filter index received from the encoder within a preconfigured filter bank and the filter residuals. Also, the filter size and/or form may be derived from the filter set specified by the filter index.

Embodiment 4

According to one embodiment of the present invention, to minimize the overhead due to transmitting coefficients of an adaptive loop filter at the picture level, the encoder/decoder (in particular, filtering unit or parametric ALF) may configure a filter bank exhibiting characteristics of the adaptive loop filter.

After deriving optimal filter coefficients that minimize the error between the original image and the reconstructed image, the encoder may transmit to the decoder a filter index for a filter set configured as filter coefficients that yield the smallest residual (or filter residual coefficients) with respect to the optimal filter coefficients within the filter bank and model indication information for specifying a model for deriving optimal filter coefficients (or filter coefficients closest to the optimal filter coefficients) on the basis of the filter coefficients of the filter set (for example, model index, model parameter and/or model coefficients).

The decoder may derive filter coefficients by adding the filter coefficients of a filter set selected by the filter index received from the encoder within the filter bank to the filter coefficients obtained from the model specified by the model indication information received from the encoder (which is called 'filter coefficients of a model'). Also, the decoder may derive the filter form and/or filter size from the filter set selected by the filter index received from the encoder.

Figure 8:
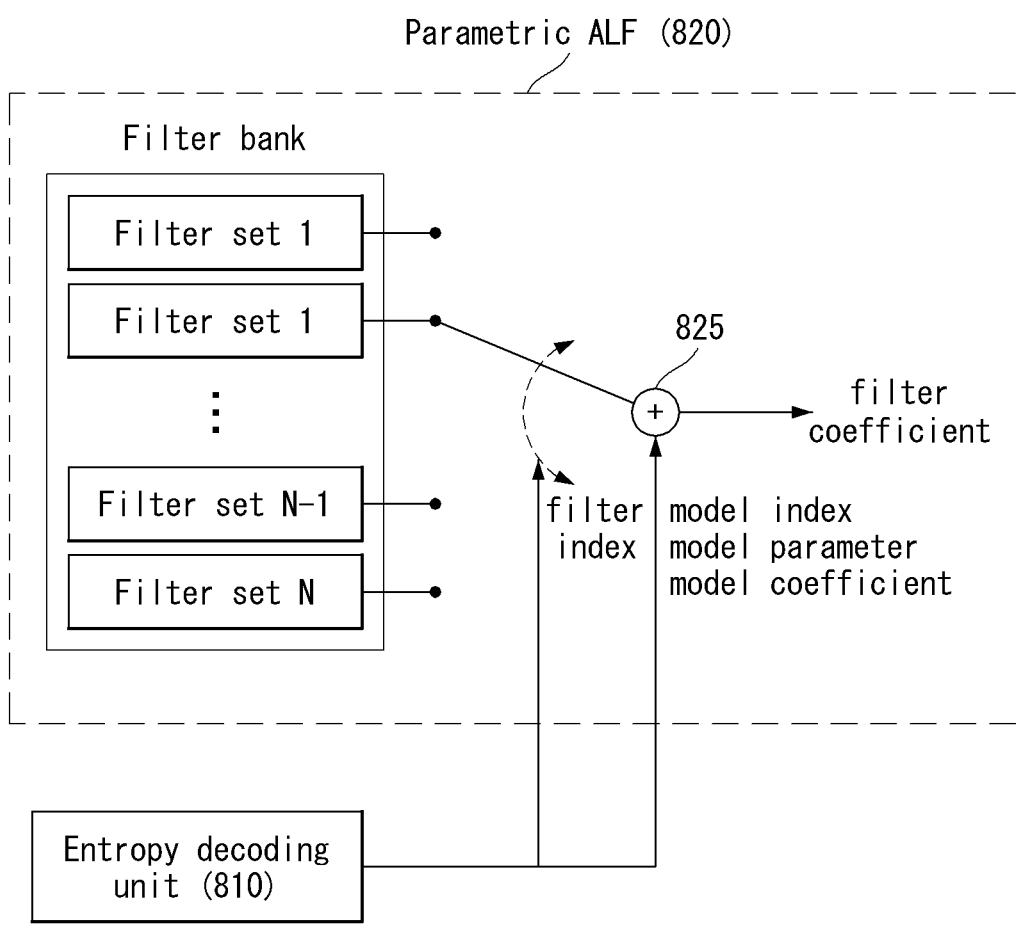
FIG. 8 illustrates a parametric adaptive loop filter operation according to one embodiment of the present invention.

FIG. 8 illustrates a parametric adaptive loop filter operation according to one embodiment of the present invention.

Referring to FIG. 8, the entropy decoding unit 810 of the decoder may parse (or derive) the filter index and model indication information from a bit stream outputted from the encoder. And the entropy decoding unit 810 delivers the parsed (or derived) filter index and filter residuals to the parametric ALF 820.

The parametric ALF 820 may obtain the filter coefficients of a specific filter set indicated by the filter index received from the entropy decoding unit 810 within a pre-configured filter bank. And the adder 825 within the parametric ALF 820 may derive filter coefficients by adding the filter coefficients of a filter set and the filter residuals received from the entropy decoding unit 810.

As described above, a filter bank may configured as a plurality of (N) filter sets. At this time, a filter bank may configured as a combination of filters such as low-pass filters, high-pass filters, all-pass filters, and band-pass filters. Also, the filter bank may include the characteristics of a filter designed according to an image direction or complexity of texture.

For each filter set, coefficients for loop filtering and/or size of the loop filter and/or form of the loop filter may be defined. And the filter index implies information indicating a filter set specified among N filter sets belonging to a filter bank.

Also configuration of a filter bank may be used in the same manner for the encoder and the decoder, which may be transmitted from the encoder to the decoder in units of slice header, PPS, SPS, or VPS.

To obtain the filter residuals (or filter residual coefficients), the encoder may calculate optimal filter coefficients at the picture level as in the conventional adaptive loop filter method. As one example, the optimal filter coefficients may be obtained by applying a numerical analysis method that reduces the error between the original image and the reconstructed image, such as the Weiner filter.

Also, the encoder may select a filter set configured as filter coefficients yielding the smallest residuals in comparison to the optimal filter coefficients from among the filter sets belonging to the filter bank.

Also, the encoder transmits model indication information for specifying a model to the decoder, by which an optimal filter (or a filter closest to the optimal filter) may be calculated from a selected filter set (namely a filter set derived from a filter index).

The model indication information may include at least one of 1) a model index indicating an employed model, 2) a model parameter for defining characteristics of the corresponding model and/or 3) model coefficients specifying coefficients for the corresponding model and/or offset value.

Table 1 illustrates syntax for parametric ALF according to one embodiment of the present invention.

TABLE 1

| ALF_param( ) | Descriptor |
| --- | --- |
| for ( i=0; i<filter_number; i++) | |
|   filter_index | ue(v) |
|   model_index | ue(v) |
|   model_param | ue(v) |
|   for (j=0; j < filter_order; j++) | |
|     filter_coeff | ue(v) |

Referring to Table 1, 'filter_number' indicates the number of filters available (or used) in the decoder.

And as many filter indices ('filter_index'), model indices ('model_index'), and model parameters ('model_param') as the number of filters ('filter_number') available (or used) in the decoder may be transmitted from the encoder.

Here, 'model_index' may indicate which model is currently used. For example, a polynomial, Gaussian, Laplacian, exponential, log, sine, cosine, or sinc function may be used for the model; also, a combination of the aforementioned functions may be used for the model.

Of the various models, a model used in the current picture (or slice or video) may be indicated by the model index.

If the encoder/decoder uses the same fixed model, the model_index syntax may not be transmitted to the decoder.

The 'model_param' may specify the parameter value for defining characteristics of the corresponding model. For example, in the case of a polynomial function, order; in the case of a Gaussian or Laplacian function, standard deviation; and in the case of an exponential function, the base value may correspond to the parameter value.

If the encoder/decoder uses the same fixed model characteristics, the model_param syntax may not be transmitted.

The filter order ('filter_order') represents a sequential number assigned to the filter available (or used) in the decoder. In other words, according to the number of filters ('filter_number'), a sequential number may be assigned to each filter according to the order of the filter.

And for each filter available (or used) in the decoder, the filter coefficient ('filter_coeff') (or model coefficient ('model_coeff')) may be transmitted from the encoder.

Here, the 'filter_coeff' may specify the coefficient and/or offset for the corresponding model.

In this manner, the decoder may specify a model by using the 'model_index', specify characteristics of a model by using the 'model_param', and derive filter coefficients by specifying model coefficients (and/or offset) by using the 'filter_coeff'. In other words, the decoder inputs the filter size as an input value to a model specified by 'model_index', 'model_param', and 'filter_coeff', thereby producing filter coefficients of the model.

Meanwhile, although FIG. 8 illustrates only the case in which a filter set is selected by a filter index, and filter coefficients are determined from the filter coefficients of the selected filter set and the filter coefficients of the obtained model, the present invention is not limited to the illustrating case.

In other words, the present invention may be applied in the same manner to the case a filter form and/or a filter size and/or filter coefficients are defined differently for each filter set belonging to the filter bank.

For example, filter set 1 may be defined to have the form of M×1 with the size M and coefficients may be defined as {a_0, . . . , a_M−1}; filter 2 may be defined to have the form of M×M with the size M and coefficients may be defined as {b_0,0, . . . , b_M,M}; and filter set 3 may be defined to have the (asymmetric) form of M×K and coefficients may be defined as {c_0,0, . . . , c_M,M}.

In this case, the encoder may obtain an optimal filter (namely filter size, form, and coefficients) that yields the smallest error between the original image and the reconstructed image. And among each filter set belonging to the filter bank, a filter of which the size and the form are the same as those of the filter calculated by the encoder is selected, and a filter set that yields the smallest residuals of the filter coefficients may be determined from among the selected filter set. And the filter index indicating the corresponding filter set and the filter residuals may be transmitted to the decoder.

The decoder, similar to the example of FIG. 8, may derive the filter coefficients by summing the filter coefficients of a filter set specified by the filter index received from the encoder within a preconfigured filter bank and the filter coefficients of the model obtained from the model specified by the model indication information. Also, the filter size and/or type may be derived from the filter set specified by the filter index.

Meanwhile, the parametric ALF described in the embodiment 2 to 4 may be used in the form of a combination. For example, a method selected from the embodiment 2 to 4 may be used in a picture group unit, a picture unit, or an area unit within a picture (slice or block unit).

Embodiment 5

According to one embodiment of the present invention, in the image encoding/decoding process, a conventional adaptive loop filter and a parametric adaptive loop filter according to the present invention may be used selectively. In other words, when the conventional adaptive loop filter is used, filter coefficients determined by the encoder may be transmitted to the decoder; when the parametric adaptive loop filter according to the present invention is used, one or more of the methods described in the embodiment 1 to 4 may be applied.

In this case, the encoder may apply both the conventional adaptive loop filter and the parametric adaptive loop filter of the present invention and may select a better method in terms of bit rate-distortion optimization. And a flag indicating whether the conventional adaptive loop filter is used or whether the parametric adaptive loop filter is used (namely a flag indicating the filter type) may be transmitted to the decoder in a picture group unit, a picture unit, or an area unit within a picture.

The decoder may use the conventional adaptive loop filter and the parametric adaptive loop filter of the present invention selectively on the basis of the flag received from the encoder.

Figure 9:
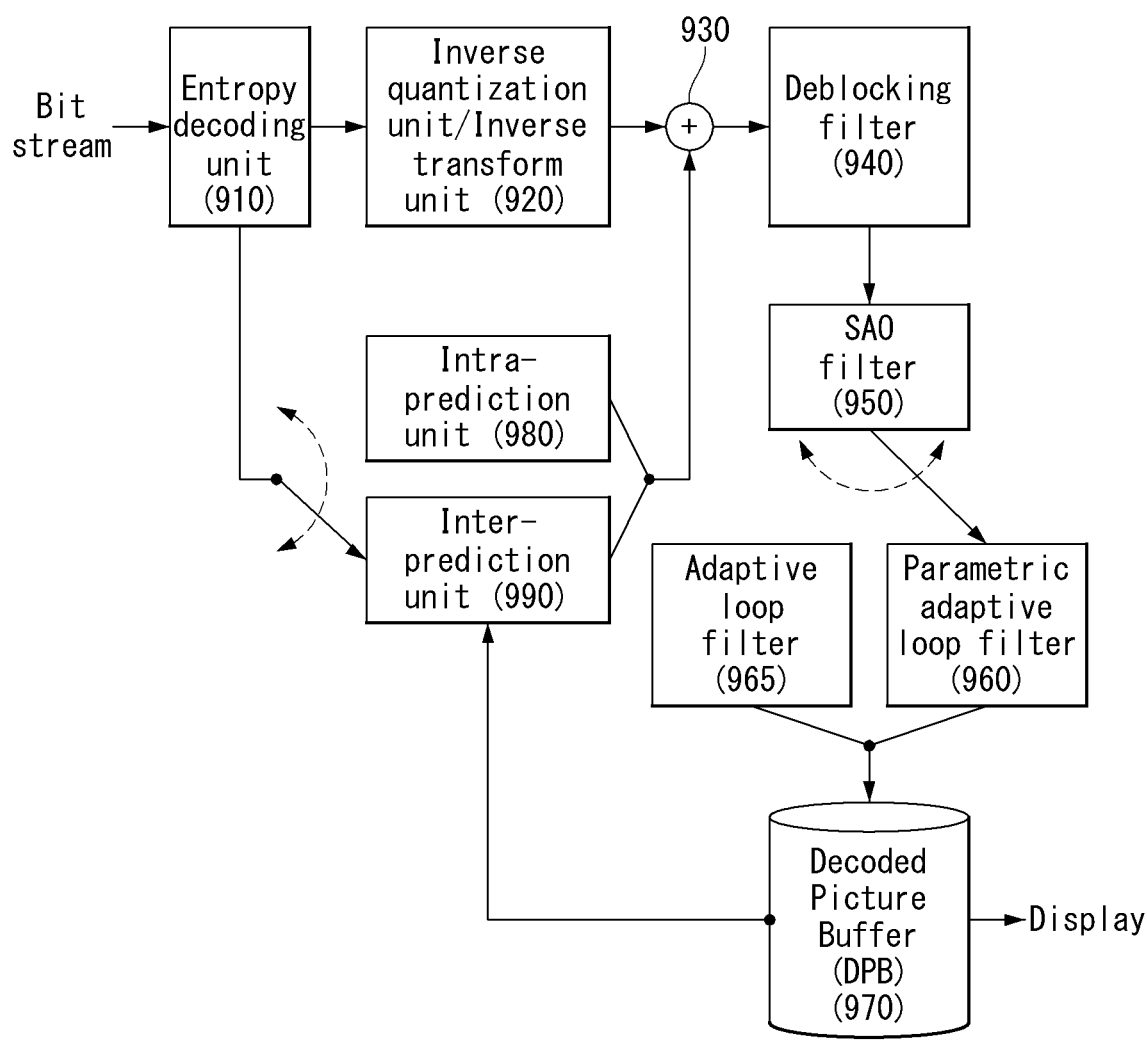
FIG. 9 illustrates a decoder including a parametric adaptive loop filter according to one embodiment of the present invention.

FIG. 9 illustrates a decoder including a parametric adaptive loop filter according to one embodiment of the present invention.

Referring to FIG. 9, the decoder may configured as an entropy decoding unit 910, dequantization/inverse transform unit 920, adder 930, deblocking filter 940, sample adaptive offset (SAO) filter 950, parametric ALF 960, ALF 976, decoded picture buffer DPB 970, intra-prediction unit 980, and inter-prediction unit 990.

The entropy decoding unit 910 performs entropy decoding through a signal outputted from the encoder (namely a bit stream).

In particular, the entropy decoding unit 910 may parse the flag indicating whether the conventional adaptive loop filter is used or whether the parametric adaptive loop filter is used.

Also, the entropy decoding unit 910 may parse (or derive) parametric ALF-related parameters from a bit stream when the parametric ALF 960 is used and may parse (or derive) ALF coefficients from a bit stream when the ALF 965 is used.

The dequantization/inverse transform unit 920 obtains transform coefficients from the entropy-decoded signal by using quantization step size information and obtains a residual signal (or residual block) by inversely transforming transform coefficients by applying an inverse transform technique.

Although FIG. 9 illustrates a case in which a dequantization unit and an inverse transform unit are implemented in the same block, they may be implemented separately from each other as shown in FIG. 2.

The adder 930 generates a reconstructed signal (or reconstructed block) by adding the obtained residual signal (or residual block) to the predicted signal (or predicted block) outputted from the prediction unit (namely inter-prediction unit 990 or intra-prediction unit 980).

The embodiments described with respect to the inter-prediction unit 181 and the intra-prediction unit 182 of the encoder 100 of FIG. 1 may be applied to the inter-prediction unit 990 and the intra-prediction unit 980 of the decoder, respectively.

The deblocking filter 940 applies a deblocking filtering to the reconstructed signal (or reconstructed image).

The SAO filter 950 applies SAO filtering by adding SAO for each pixel to the reconstructed signal (or reconstructed image) for which deblocking filtering is applied.

Both the parametric ALF 960 and ALF 965 are filters applied to the image for which up to the SAO filter is applied and are used to minimize an error from the original image.

At this time, whether the parametric ALF 560 is applied or whether the ALF 965 is applied to the image may be determined, where up to the SAO filter is applied to the image on the basis of the flag indicating whether the conventional adaptive loop filter parsed by the entropy decoding unit 910 is used or whether the parametric adaptive loop filter according to the present invention is used (namely the flag indicating the filter type).

Here, the parametric ALF 960 may determine filter coefficients and/or filter size and/or filter form by using the parametric ALF-related parameters received from the entropy decoding unit 910. And filtering may be performed by using the determined filter.

On the other hand, the ALF 965 may perform filtering by using the ALF coefficients received from the entropy decoding unit 910.

Also, different from the example of FIG. 9, the parametric ALF may be applied to the reconstructed signal (or reconstructed block) outputted from the adder 930 (in this case, the deblocking filter 940 and SAO filter 950 may be omitted)

or may be applied to the deblocking filtered image outputted from the deblocking filter 940 (in this case, the SAO filter 950 may be omitted).

Although FIG. 9 illustrates a case in which the deblocking filter 940, SAO filter 950, and ALF 960 are implemented separately, the deblocking filter 940, SAO filter 950, and ALF 960 may be implemented in one filtering unit as shown in FIG. 2.

The DPB 970 may store a filtered picture to display the filtered picture or to use the filtered picture as a reference picture in the inter-prediction unit 990.

Figure 10:
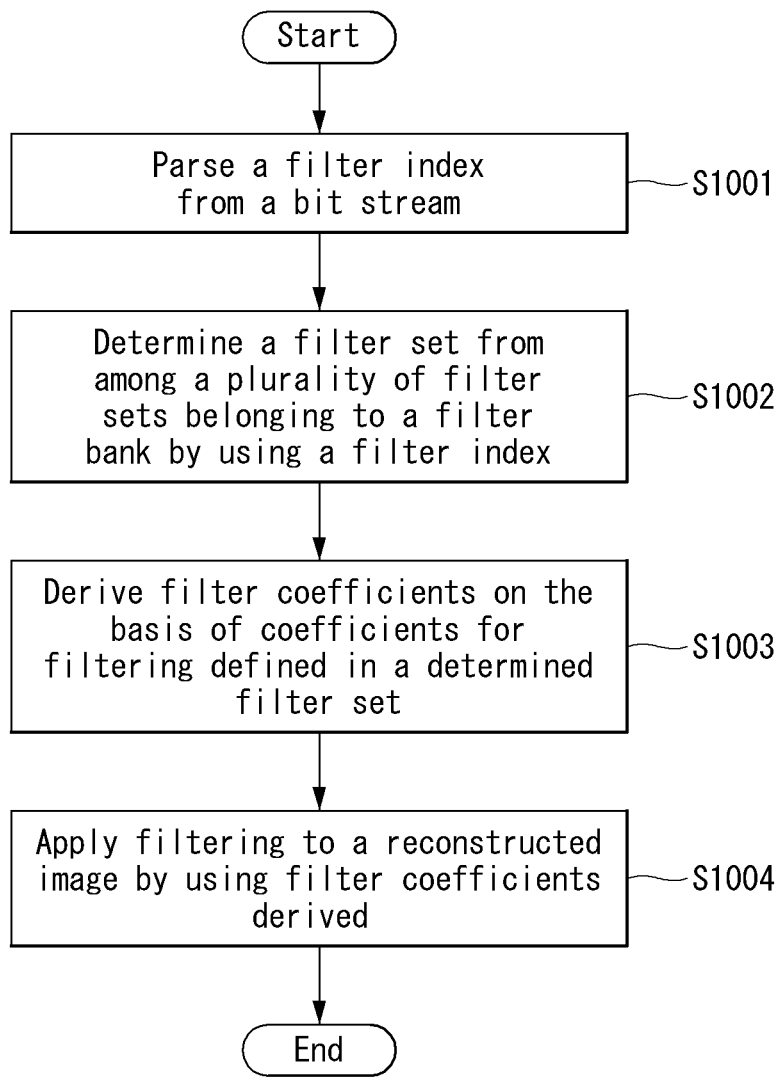
FIG. 10 illustrates a method for decoding an image according to one embodiment of the present invention.

FIG. 10 illustrates a method for decoding an image according to one embodiment of the present invention.

Referring to FIG. 10, the decoder parses the filter index from a bit stream outputted from the encoder S1001.

According to the embodiment 2, the filter index may indicate a filter set that minimizes an error between the original image and the reconstructed image among a plurality of filter sets belonging to the filter bank.

According to the embodiment 3, the decoder may further parse the filter residual coefficients together with the filter index.

In this case, the filter index may indicate a filter set that defines coefficients for filtering that yields the smallest residuals from the optimal filter coefficients that minimizes the error between the original image and the reconstructed image. At this time, the filter residual coefficients may correspond to the residuals between the optimal filter coefficients and the coefficients for filtering defined by the filter set determined by the filter index.

Also, according to the embodiment 4 above, the decoder may further parse model indication information that specifies a model for deriving filter coefficients together with the filter index. The model indication information may include one or more of the model index indicating which model is used, model parameter for defining characteristics of a model, and coefficients for the model.

Also, according to the embodiment 5 above, the decoder may further parse the flag that indicates the filter type from a bit stream. And according to the value of the flag, whether the parametric ALF according to the present invention is used or whether the existing ALF is used may be determined. In other words, according to the value of the flag, whether the filter coefficients are derived from a filter set determined by the filter index from among the filter bank may be determined.

The decoder determines the filter set by using the filter index among a plurality of filter sets belonging to a predetermined filter bank S1002.

At this time, the filter bank may be defined in advance for the encoder and the decoder. Also, the filter bank may be transmitted from the encoder to the decoder through the PPS, SPS, or VPS.

The decoder derives filter coefficients on the basis of the coefficients for filtering defined in a filter set determined by the filter index S1003.

According to the embodiment 2 above, each filter set may define coefficients for filtering and use the coefficients for filtering defined in a filter set determined by the filter index as the filter coefficients.

According to the embodiment 3, the filter coefficients may be derived by adding the coefficients for filtering defined in a filter set determined by the filter index and the filter residual coefficients.

According to the embodiment 4, the filter coefficients may be derived by adding the coefficients for filtering defined in a filter set determined by the filter index and coefficients derived from a model specified by the model indication information.

The decoder applies filtering to the reconstructed image obtained from the predicted signal and the residual signal by using the derived filter coefficients S1004.

Figure 11:
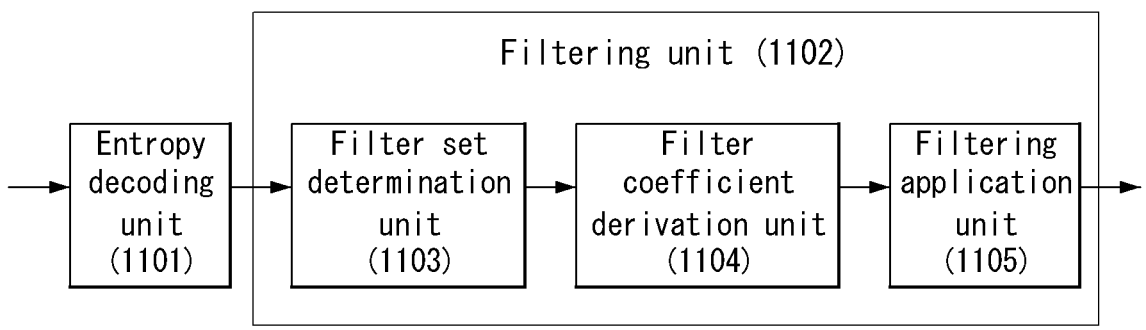
FIG. 11 illustrates a decoding device according to one embodiment of the present invention.

FIG. 11 illustrates a decoding device according to one embodiment of the present invention.

Referring to FIG. 11, the decoder implements functions, processes and/or methods proposed in FIGS. 5 to 10. More specifically, the decoder may comprise an entropy decoding unit 1101 and filtering unit 1102; and the filtering unit 1102 may configured as a filter set determination unit 1103, filter coefficient derivation unit 1104, and filtering application unit 1105.

The specific structure of the decoder illustrated in FIG. 11 is only an example; part of the decoder structure illustrated in FIG. 11 may be employed in another structure of the decoder, or the decoder may be implemented so that any one of the decoder structure is implemented being separated from the others in terms of its functionality; and a different structure not shown in FIG. 11 may also be added to implement the decoder.

Also, the filtering unit 1102 may further configured as the deblocking filter and SAO filter.

The entropy decoding unit 1101 parses the filter index from a bit stream outputted from the encoder.

According to the embodiment 2, the filter index may indicate a filter set that minimizes an error between the original image and the reconstructed image among a plurality of filter sets belonging to the filter bank.

According to the embodiment 3, the entropy decoding unit 1101 may further parse the filter residual coefficients together with the filter index.

In this case, the filter index may indicate a filter set that defines coefficients for filtering that yields the smallest residuals from the optimal filter coefficients that minimizes the error between the original image and the reconstructed image. At this time, the filter residual coefficients may correspond to the residuals between the optimal filter coefficients and the coefficients for filtering defined by the filter set determined by the filter index.

Also, according to the embodiment 4 above, the entropy decoding unit 1101 may further parse model indication information that specifies a model for deriving filter coefficients together with the filter index. The model indication information may include one or more of the model index indicating which model is used, model parameter for defining characteristics of a model, and coefficients for the model.

Also, according to the embodiment 5 above, the entropy decoding unit 1101 may further parse the flag that indicates the filter type from a bit stream. And according to the value of the flag, whether the parametric ALF according to the present invention is used or whether the existing ALF is used may be determined. In other words, according to the value of the flag, whether the filter coefficients are derived from a filter set determined by the filter index from among the filter bank may be determined.

The filter set determination unit 1103 determines the filter set by using the filter index among a plurality of filter sets belonging to a predetermined filter bank.

At this time, the filter bank may be defined in advance for the encoder and the decoder. Also, the filter bank may be transmitted from the encoder to the decoder through the PPS, SPS, or VPS.

The filter coefficient derivation unit 1104 derives filter coefficients on the basis of the coefficients for filtering defined in a filter set determined by the filter index.

According to the embodiment 2 above, each filter set may define coefficients for filtering and use the coefficients for filtering defined in a filter set determined by the filter index as the filter coefficients.

According to the embodiment 3, the filter coefficients may be derived by adding the coefficients for filtering defined in a filter set determined by the filter index and the filter residual coefficients.

According to the embodiment 4, the filter coefficients may be derived by adding the coefficients for filtering defined in a filter set determined by the filter index and coefficients derived from a model specified by the model indication information.

The filtering application unit 1105 applies filtering to the reconstructed image obtained from the predicted signal and the residual signal by using the derived filter coefficients.

Meanwhile, although FIGS. 10 and 11 mainly illustrate a method for deriving filter coefficients for the convenience of descriptions, filter form and/or filter size may also be determined from a filter set determined by the filter index from among a plurality of filter sets belonging to a filter bank.

Also, when the parametric ALF according to the present invention is used, a method selected from the embodiment 2 to 4 may be used in a picture group unit, a picture unit, or an area unit within a picture (slice or block unit) as described above.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

So far, the preferred embodiments of the present invention described above are disclosed as examples, and may be modified, changed, substituted or added by other various embodiments within the inventive concept and scope of the present invention described in the enclosed claims below by those skilled person in the art.

The invention claimed is:

1. A method for decoding an image by a decoder, the method comprising:
   parsing a filter index from a bit stream transmitted from an encoder;
   parsing model indication information that specifies a model for deriving model coefficients from the bit stream, wherein the model indication information includes a model index indicating the model that is used and model parameters that are used for defining characteristics of the model;
   determining a filter set indicated by the filter index, from among a plurality of filter sets belonging to a filter bank, wherein the filter bank is pre-defined for the encoder and the decoder in a same manner;
   deriving filter coefficients by adding coefficients for filtering defined in the filter set indicated by the filter index and the model coefficients obtained from the model specified by the model indication information; and
   applying filtering to a reconstructed image obtained from a predicted signal and a residual signal by using the derived filter coefficients.

2. The method of claim 1, wherein the filter index indicates the filter set that minimizes an error between the original image and the reconstructed image among a plurality of filter sets belonging to the filter bank.

3. The method of claim 1, further comprising:
   parsing filter residual coefficients from the bit stream, wherein the filter coefficients are derived by summing coefficients for filtering defined by the filter set determined by the filter index and the filter residual coefficients.

4. The method of claim 3, wherein the filter index indicates, from among a plurality of filter sets belonging to the filter bank, the filter set defining coefficients for filtering that has a minimum difference from optimal filter coefficients that minimize an error between the original image and the reconstructed image.

5. The method of claim 4, wherein the filter residual coefficients correspond to residuals between the optimal filter coefficients and the coefficients for filtering defined by the filter set determined by the filter index.

6. The method of claim 1, further comprising:
   parsing a flag indicating type of a filter from the bit stream, wherein whether the filter coefficients are derived from the filter set determined by the filter index among the filter bank is determined according to a value of the flag.

7. A decoder for decoding an image, the decoder comprising:
a processor configured to:
- parse a filter index from a bit stream transmitted from an encoder;
- parse model indication information that specifies a model for deriving model coefficients from the bit stream, wherein the model indication information includes a model index indicating the model that is used and model parameters that are used for defining characteristics of the model;
- determine a filter set indicated by the filter index, among a plurality of filter sets belonging to a filter bank, wherein the filter bank is pre-defined for the encoder and the decoder in a same manner;
- derive filter coefficients by adding coefficients for filtering defined by the filter set indicated by the filter index and the model coefficients obtained from the model specified by the model indication information; and
- apply filtering to a reconstructed image obtained from a predicted signal and a residual signal by using the derived filter coefficients.

* * * * *